(12) United States Patent
Grossen

(10) Patent No.: US 8,418,777 B1
(45) Date of Patent: Apr. 16, 2013

(54) AGRICULTURAL FOLDING SCRAPER BLADE

(75) Inventor: Gary R. Grossen, Donald, OR (US)

(73) Assignee: GK Machine, Inc., Donald, OR (US)

( * ) Notice: Subject to any disclaimer, the term of this patent is extended or adjusted under 35 U.S.C. 154(b) by 0 days.

(21) Appl. No.: 13/316,425

(22) Filed: Dec. 9, 2011

(51) Int. Cl.
*E02F 3/76* (2006.01)
(52) U.S. Cl.
USPC ........................................ 172/820; 172/799.5
(58) Field of Classification Search .................. 172/820, 172/819, 799, 821, 795, 824, 799.5
See application file for complete search history.

(56) References Cited

U.S. PATENT DOCUMENTS

| | | | | |
|---|---|---|---|---|
| 2,960,815 A * | 11/1960 | Van Der Lely et al. | ......... | 56/377 |
| 3,430,366 A * | 3/1969 | King | ............................... | 37/428 |
| 3,529,678 A * | 9/1970 | Teasdale | ....................... | 172/821 |
| 3,542,135 A * | 11/1970 | McCanse | ....................... | 172/319 |
| 3,670,825 A * | 6/1972 | Asal et al. | ..................... | 172/821 |
| 4,248,311 A * | 2/1981 | Frisbee et al. | ................ | 172/819 |
| 4,279,312 A * | 7/1981 | Pyle | ............................... | 172/789 |
| 4,658,519 A * | 4/1987 | Quenzi | ........................... | 37/231 |
| 4,898,247 A * | 2/1990 | Springfield | ................ | 172/799.5 |
| 5,094,063 A * | 3/1992 | Wattron et al. | ..................... | 56/6 |
| 5,107,663 A * | 4/1992 | Wattron et al. | ................ | 56/15.7 |
| 5,165,191 A * | 11/1992 | Davis | ............................... | 37/409 |
| 5,203,154 A * | 4/1993 | Lesher et al. | ................... | 56/366 |
| 5,417,042 A * | 5/1995 | Walch et al. | ......................... | 56/6 |
| 6,035,944 A * | 3/2000 | Neuner et al. | ................ | 172/818 |
| 6,055,800 A * | 5/2000 | Walch | ............................ | 56/16.7 |
| 6,109,363 A * | 8/2000 | High | ............................... | 172/820 |
| 6,269,619 B1 * | 8/2001 | Walch et al. | ..................... | 56/14.9 |
| 6,269,885 B1 * | 8/2001 | Barber et al. | ..................... | 172/7 |
| 6,360,516 B1 * | 3/2002 | Harkcom et al. | ............... | 56/15.5 |
| 6,381,935 B1 * | 5/2002 | Wattron et al. | ................. | 56/14.9 |
| 6,655,118 B1 * | 12/2003 | Thompson et al. | ............ | 56/15.8 |
| 6,662,540 B1 * | 12/2003 | Harkcom et al. | ............... | 56/228 |
| 6,691,435 B1 * | 2/2004 | Schultz et al. | .................. | 37/234 |
| 6,719,066 B2 * | 4/2004 | Haringer | ....................... | 172/821 |
| 7,024,844 B2 * | 4/2006 | Schlesser et al. | ............. | 56/14.9 |
| 7,458,428 B2 * | 12/2008 | Laudick et al. | .................... | 172/1 |
| 7,469,648 B2 | 12/2008 | Bettin | | |
| 7,540,332 B2 | 6/2009 | Friggstad | | |
| 7,617,882 B1 * | 11/2009 | Street | ............................. | 172/817 |
| 7,740,084 B2 | 6/2010 | Rosenboom | | |
| 7,743,536 B2 | 6/2010 | Evans | | |
| 7,836,613 B2 * | 11/2010 | Koch et al. | ...................... | 37/231 |
| 7,891,048 B2 | 2/2011 | Mensch | | |
| 7,934,328 B2 * | 5/2011 | Gamble, II | ....................... | 37/273 |

(Continued)

FOREIGN PATENT DOCUMENTS

DE 2135573 C * 8/1982

*Primary Examiner* — Arpád Fábián-Kovács
(74) *Attorney, Agent, or Firm* — Antoinette M. Tease

(57) ABSTRACT

An agricultural implement includes a traction structure and a tool beam rearward of the traction structure. First and second wheeled support structures support the tool beam at opposite respective ends of the tool beam. First and second linkages each have a forward portion connected to the traction structure and rearward portions connected to the first and second support structures respectively. An actuator is effective between the traction structure and the first linkage for selectively adjusting an angular position of the first linkage relative to the longitudinal axis of the traction structure. The tool beam provides a force transmitting connection between the rearward portions of the first and second linkages whereby angular movement of the first linkage relative to the traction structure is accompanied by angular movement of the second linkage relative to the traction structure.

3 Claims, 9 Drawing Sheets

U.S. PATENT DOCUMENTS

| | | |
|---|---|---|
| 7,942,209 B1 * | 5/2011 | Volz et al. ..................... 172/197 |
| 8,118,533 B2 * | 2/2012 | Thompson et al. ........... 414/550 |
| 2005/0087350 A1 | 4/2005 | Bauer |
| 2007/0169950 A1 | 7/2007 | Grieshop |
| 2008/0053351 A1 | 3/2008 | Bettin |
| 2008/0235996 A1 * | 10/2008 | Evans et al. ..................... 37/232 |
| 2011/0116865 A1 | 5/2011 | Schmidt |
| 2012/0291320 A1 * | 11/2012 | Guynn ........................... 37/428 |

* cited by examiner

AGRICULTURAL FOLDING SCRAPER BLADE

BACKGROUND OF THE INVENTION

The subject matter of this application relates to agricultural implements.

In order to maximize yields of certain crops while minimizing water usage, it is desirable to prepare the soil of the field or planting area so that the surface of the soil within the planting area has an optimum topography. Typically, such preparation is performed using an agricultural scraper, which may comprise a blade that is supported in a generally horizontal disposition on a frame provided with ground-engaging wheels and a tongue for attachment to a tractor or other towing vehicle. Global positioning system (GPS) receivers may be mounted at the two opposite ends of the blade for measuring difference in height between the two ends of the blade and the frame may be movable vertically relative to the wheel axles by use of hydraulic cylinders or other actuators in order to adjust the height of one or both ends of the blade. By drawing the scraper over the soil, variations in height of the surface of the soil may be reduced or eliminated.

The blade of a conventional agricultural scraper may be as much as 20 feet long. The length of the blade presents a substantial challenge when moving a scraper from field to field of a farming operation and an even greater challenge when it is necessary to move the scraper over public roads and highways. One conventional scraper meets this challenge by employing two separate sets of wheels, for scraping and for road transportation respectively. At least one set of wheels is movable between a storage position and deployed position. Such an arrangement is complex and expensive and is prone to breakdown.

In operation of a conventional agricultural scraper, the blade extends perpendicular to the direction of travel of the frame. Thus, the soil that is moved by the scraper moves generally in the direction of travel of the frame. However, it may be desirable when using a scraper to feed the soil to left or right of the direction of travel.

SUMMARY OF THE INVENTION

In accordance with a first aspect of the present invention there is provided an agricultural implement comprising a traction structure at a forward end of the implement, a tool beam rearward of the traction structure and extending transverse to a longitudinal axis of the traction structure in a substantially horizontal disposition, first and second wheeled support structures supporting the tool beam at opposite respective ends of the tool beam, first and second linkages each having a forward portion connected to the traction structure and having rearward portions connected to the first and second support structures respectively, and an actuator effective between the traction structure and the first linkage for selectively adjusting an angular position of the first linkage relative to the longitudinal axis of the traction structure, and wherein the tool beam provides a force transmitting connection between the rearward portions of the first and second linkages whereby angular movement of the first linkage relative to the traction structure is accompanied by angular movement of the second linkage relative to the traction structure.

In accordance with a second aspect of the present invention there is provided an agricultural scraper comprising a traction structure at a forward end of the scraper, and a scraper blade rearward of the traction structure and extending transverse to a longitudinal axis of the traction structure in a substantially horizontal disposition, first and second wheeled support structures supporting the scraper blade at opposite respective ends of the scraper blade, and wherein the scraper blade comprises first and second segments each having an outer end and an inner end, the outer ends of the first and second segments are supported by the first and second support structures respectively, the inner ends of the first and second segments are connected together by a hinge that allows the scraper blade to be folded about a substantially vertical axis, whereby the first and second segments can be brought selectively to an aligned disposition or to a folded disposition, and the first and second segments are brought from the aligned disposition to the folded disposition by moving the inner ends of the first and segments forward relative to the outer ends of the first and second segments.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
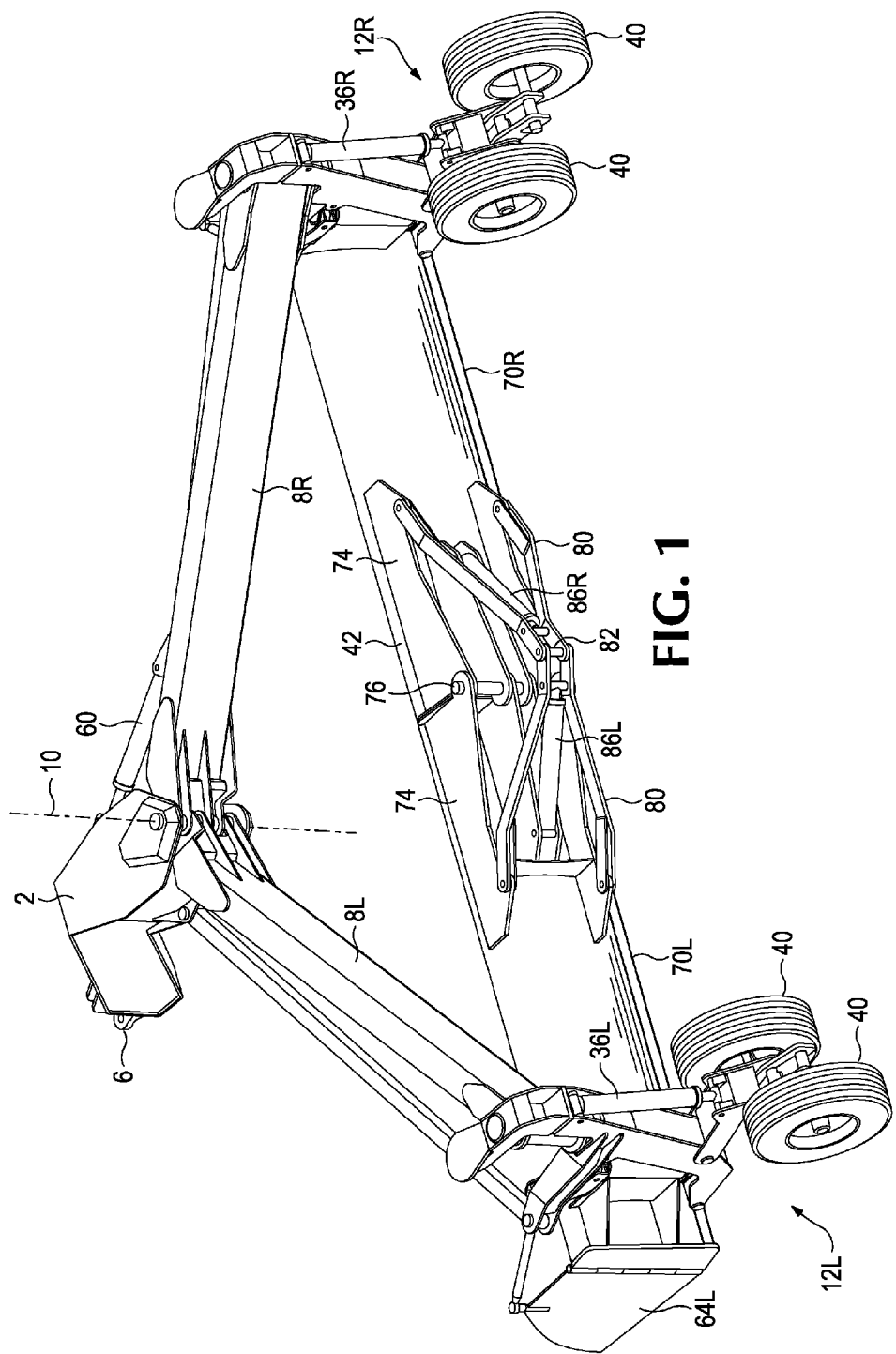
FIG. 1 is a perspective view of an agricultural scraper embodying subject matter disclosed in this application.
Figure 2:
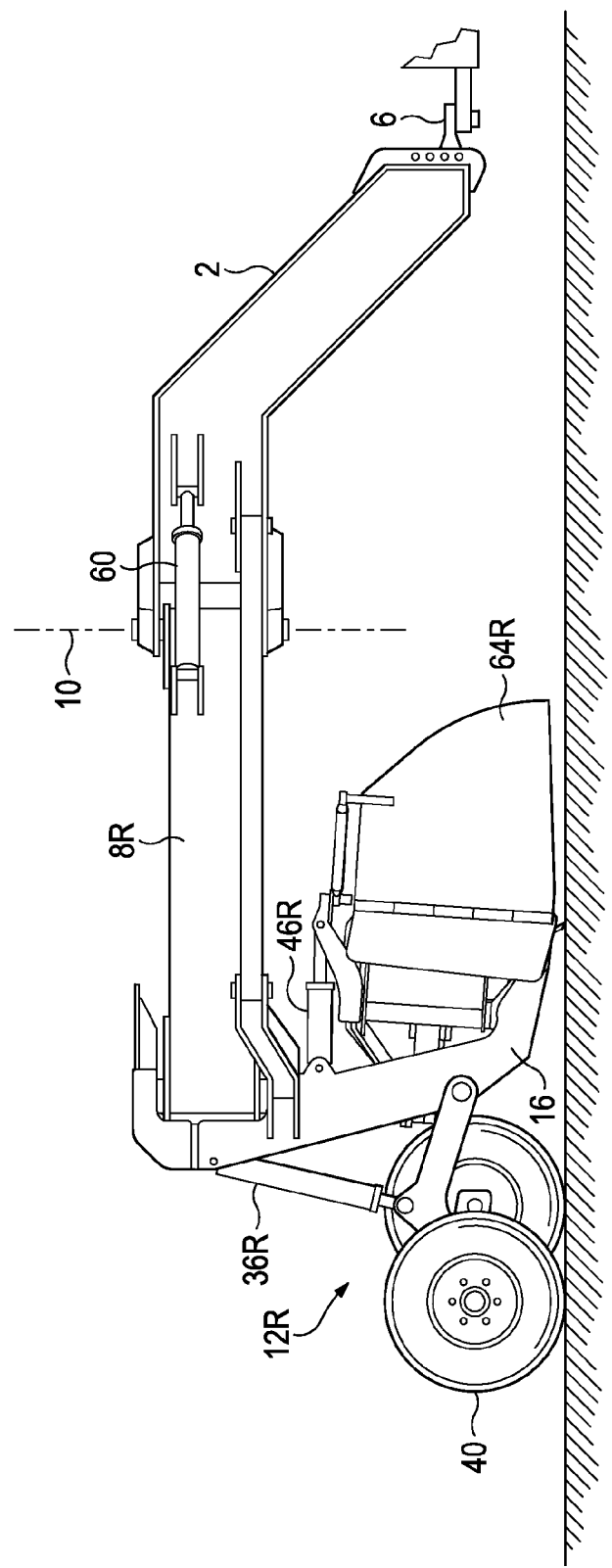
FIG. 2 is a right side elevation of the scraper.

In the following description, the suffix L or R may be used to designate left or right. The suffix may be omitted when the description pertains equally to left and right.

The illustrated agricultural scraper comprises a tongue 2 provided at a forward end with a coupler 6 for attachment to a tractor 4 or other towing vehicle. Two beams 8L, 8R are connected at respective proximal ends to the rear end of the tongue in a manner allowing pivotal movement of the beams about a vertical axis 10 that is directly to the rear of the coupler 6. The two beams 8L, 8R are supported at their distal ends by wheel assemblies 12L, 12R respectively. Each wheel assembly 12 comprises a generally C-shaped blade support structure 16 including a cylindrical bearing post 20 mounted between the top arm of the C-shaped structure and a mounting point 22. The bearing post 20 is fitted in a bearing (not shown) at the distal end of the respective beam 8 so that beam is turnable relative to the wheel assembly about an axis 24 perpendicular to the longitudinal axis of the beam.

Figure 3:
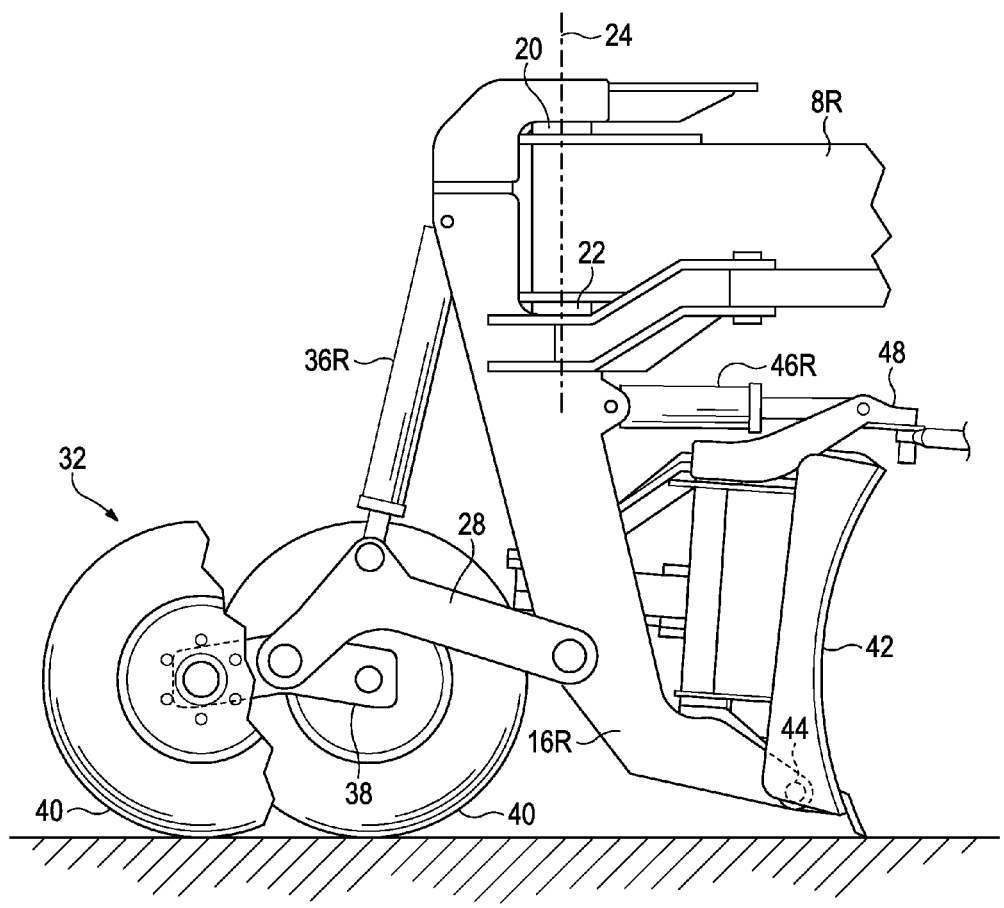
FIG. 3 is an enlarged side elevation of a blade support structure in a lowered position.

A wheel carrier link 28 is pivotally attached to the blade support structure 16 near the lower end thereof and a wheel truck 32 is pivotally attached to the wheel carrier link 28 at a rear end thereof. The wheel truck 32 comprises a rocker 38 and fore and aft wheels 40 mounted on axles projecting from the rocker. A hydraulic cylinder 36 is effective between the wheel carrier link 28 and an attachment point near the upper end of the blade support structure 16, whereby the blade support structure may be selectively raised (FIG. 4) and lowered (FIG. 3) relative to the wheels, raising and lowering the bearing post 20 and the distal end of the beam 8. Pivotal movement of the rocker 38 relative to the wheel carrier link allows the wheels to remain in contact with the ground surface under changes in topography of the ground surface and changes in angular position of the wheel carrier link when the blade support structure 16 is raised and lowered.

A scraper blade 42 having two opposite (right and left) ends is supported between the two blade support structures 16. At each end of the scraper blade, a lower edge of the scraper blade is pivotally supported at the lower end of the blade support structures by a pivot pin engaging in a sleeve bearing and an upper edge of the scraper blade is connected to the blade support structure by a double-acting hydraulic cylinder 46 engaging a mounting bracket 48 attached to the scraper blade. By extending and retracting the hydraulic cylinders 46L, 46R, the blade 42 can be tilted about its lower edge relative to the wheel trucks.

Figure 4:
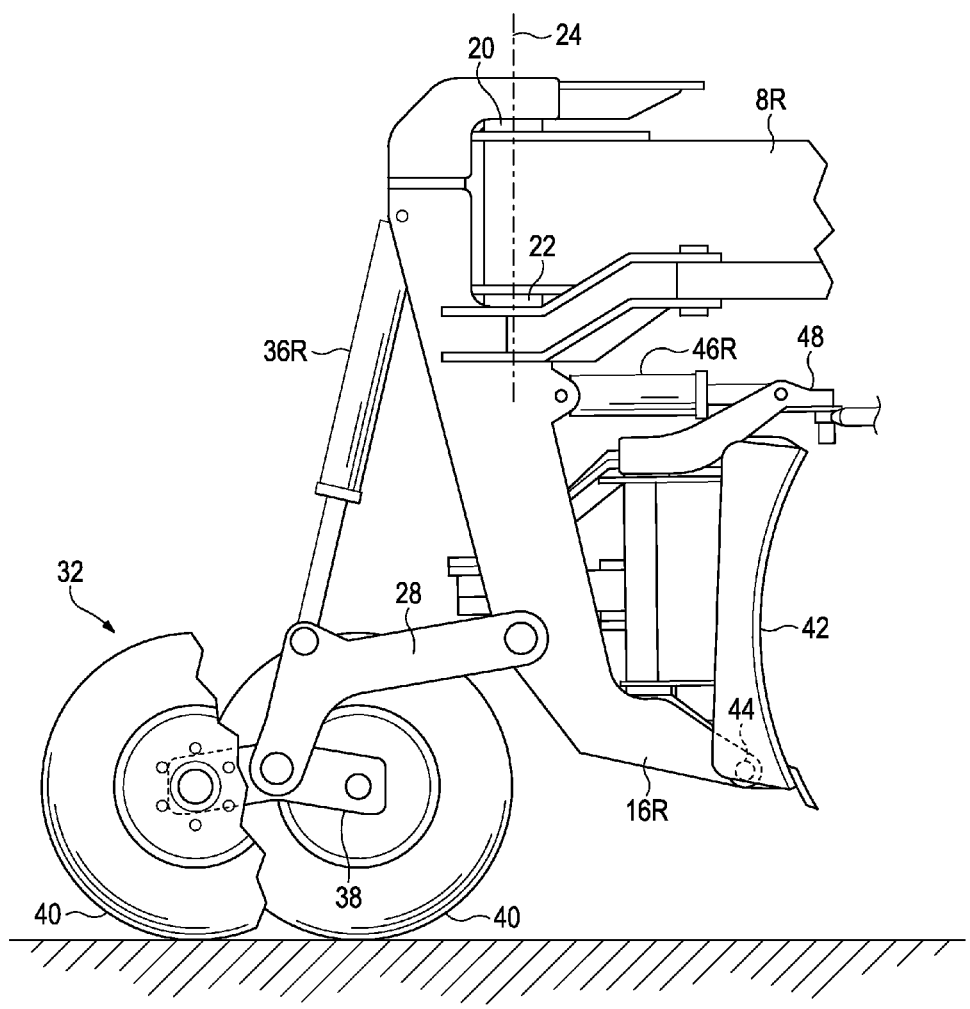
FIG. 4 is a similar view of the blade support structure in an elevated position.

A lever arm 52 projects laterally of each scraper support structure 16 at about 60° to the axles of the wheels 40. As shown in FIG. 4, the lever arm 52 is at about 90° to the beam 8. The distal end of the lever arm is pivotally connected to one end of a bar 56, the opposite end of which is pivotally attached to the tongue at a point that is spaced from the pivot axis 10 by a distance that is substantially equal to the length of the lever arm. The beam 8, lever arm 52, connecting bar 56 and tongue 2 form a four-bar linkage.

Figure 5:
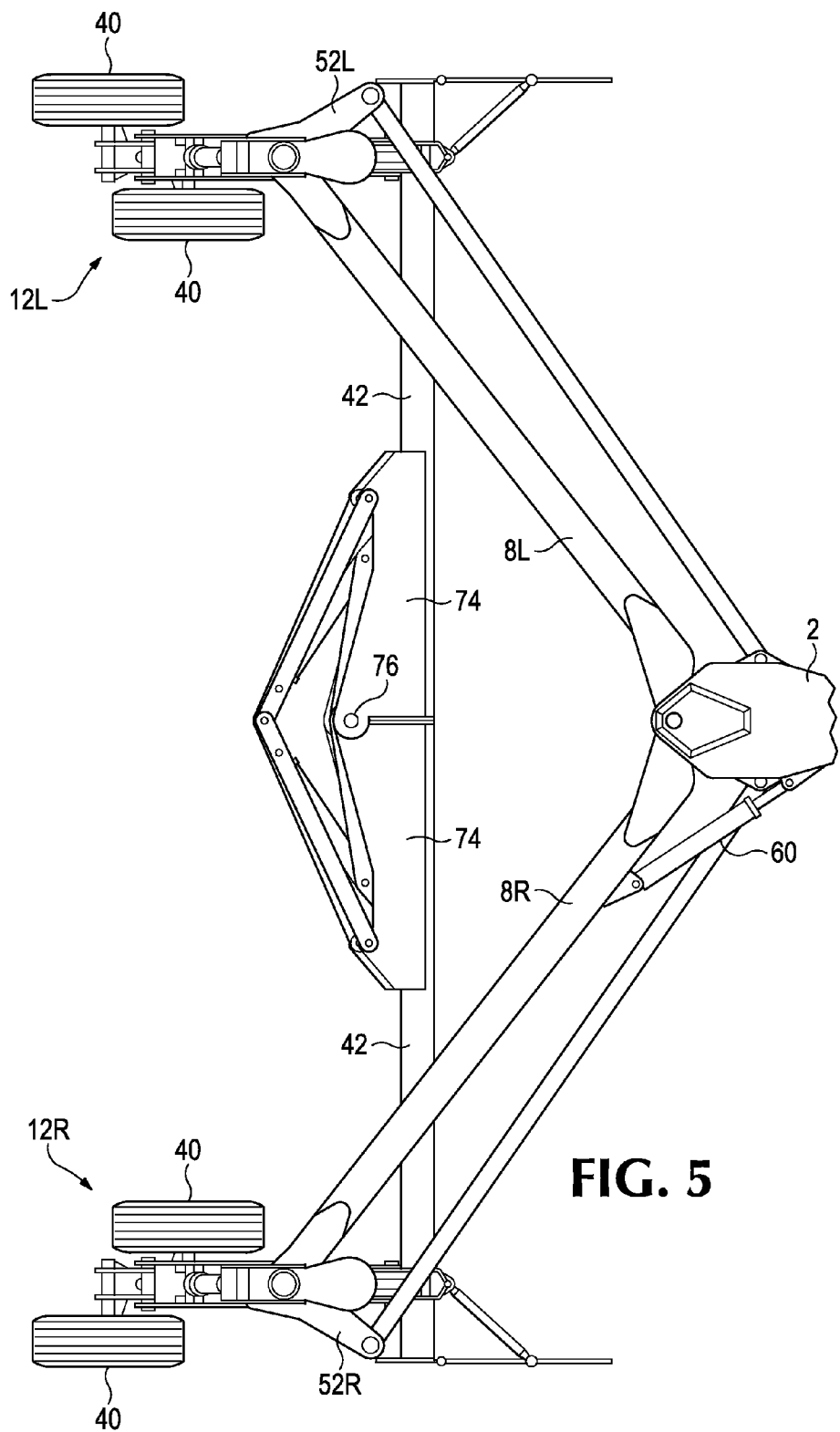
FIG. 5 is a top plan view of the scraper, showing the scraper blade disposed perpendicular to the path of movement of the scraper.
Figure 9:
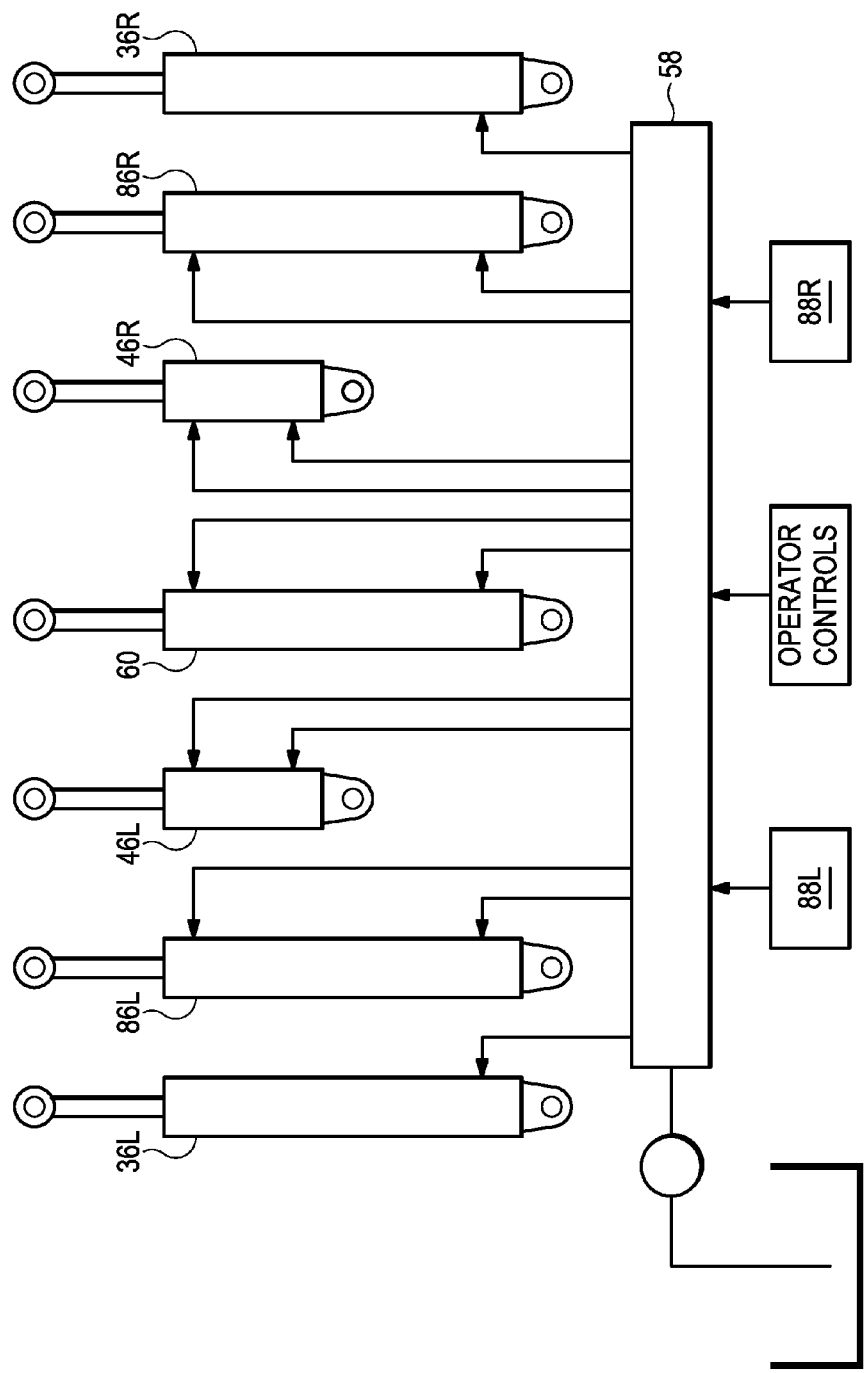
FIG. 9 is a schematic view illustrating a hydraulic control system of the scraper.

The tongue 2 may be considered to have a longitudinal axis that intersects the axis 10 and the axis about which the tongue turns relative to the towing tractor when the tractor is steered to left or right. In the disposition shown in FIGS. 1 and 5, the blade is perpendicular to the longitudinal axis of the tongue and the wheel axles are parallel to the blade and to the longitudinal axis of the tongue. As the tractor tows the scraper over a surface, a hydraulic controller 58 (FIG. 9) controls supply of hydraulic fluid to the cylinders 36 to place the blade at a suitable height relative to the wheels 40 and at a suitable inclination to horizontal to move soil so as to achieve a desired topography.

When the towing tractor is towing the scraper straight ahead, the tracking path of the wheels (i.e. the path perpendicular to the axles on which the wheels are mounted) is parallel to the longitudinal axis of the tongue. In the event that the tractor is steered to left or right, the tongue tends to turn about the axis 10 and the four-bar linkages transmit the turning movement of the tongue to the wheel assemblies 12, which also turn to left or right following the tongue.

A double-acting hydraulic cylinder 60 is effective between the tongue 2 and the beam 8R. When the cylinder is retracted from the disposition shown in FIG. 1, the beam 8R is forced to turn counterclockwise relative to the tongue (as seen in FIG. 1) about the pivot axis 10 and the distal end of the beam 8R is forced forward. Since the blade 42 rigidly connects the distal end of the beam 8L to the distal end of the beam 8R, the beam 8L also turns counterclockwise relative to the tongue about the pivot axis 10 and the distal end of the beam 8L is forced rearward. As the beams 8 turn, the four-bar linkages constrain the lever arms 52 to remain at a constant angular position relative to the tongue and consequently the blade support structures do not turn and the wheel axles remain perpendicular to the longitudinal axis of the tongue. Correspondingly, when the cylinder is extended from the disposition shown in FIG. 1, the beam 8R turns clockwise relative to the tongue and the distal end of the beam 8R is forced rearward. The beam 8L also turns clockwise relative to the tongue and the distal end of the beam 8L is forced forward. The four-bar linkages constrain the lever arms 52 to remain at a constant orientation relative to the tongue and the wheel axles remain perpendicular to the longitudinal axis of the tongue. The scraper shown in the drawings is therefore adjustable between a position in which the blade is perpendicular to the direction of travel of the scraper and a position in which either the left end or the right end of the blade is forward of the other end, allowing the scraper to feed material to either side.

In some cases it may be desired to discharge the material to one side of the path of the scraper but in other cases it may be desired to displace the material to left or right of the path of the scraper without discharging the material. Accordingly, the blade is provided at each end with a detachable retaining fence 64 that is hinged to the end of the blade and is pivotally connected to one end of a rod 68, the opposite end of which is pivotally connected to the forward end of the mounting bracket 48. The locations of the points of pivotal connection of the fence 64 and rod 68 to the blade 42 and bracket 48 are such relative to the axis 24 that the bracket 48, rod 68, fence 64 and blade 42 form a parallelogram linkage and accordingly the fence 64 remains parallel with the tracking path of the wheels, even though the scraper blade may not be perpendicular to the tracking path of the wheels.

Figure 7:
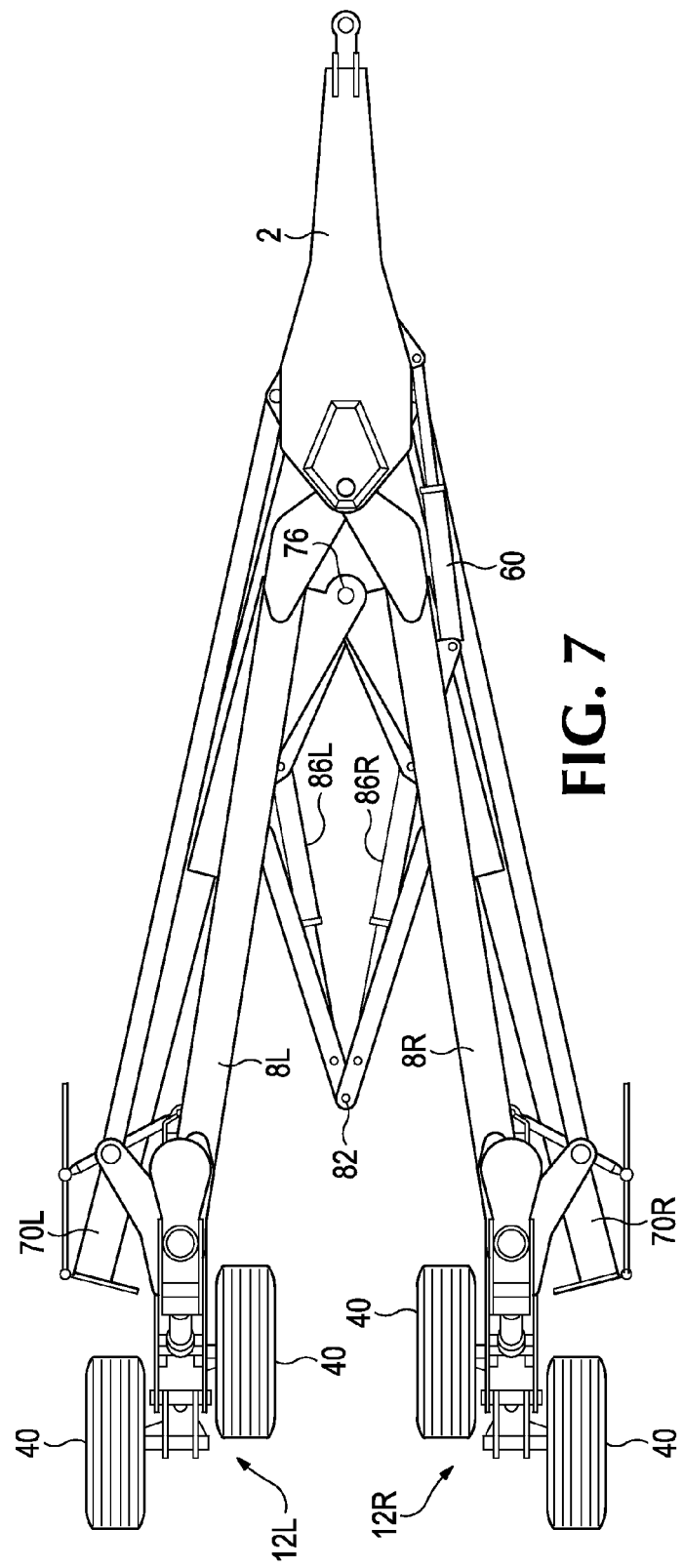
FIG. 7 is a top plan view of the scraper showing the blade in a folded disposition.
Figure 8:
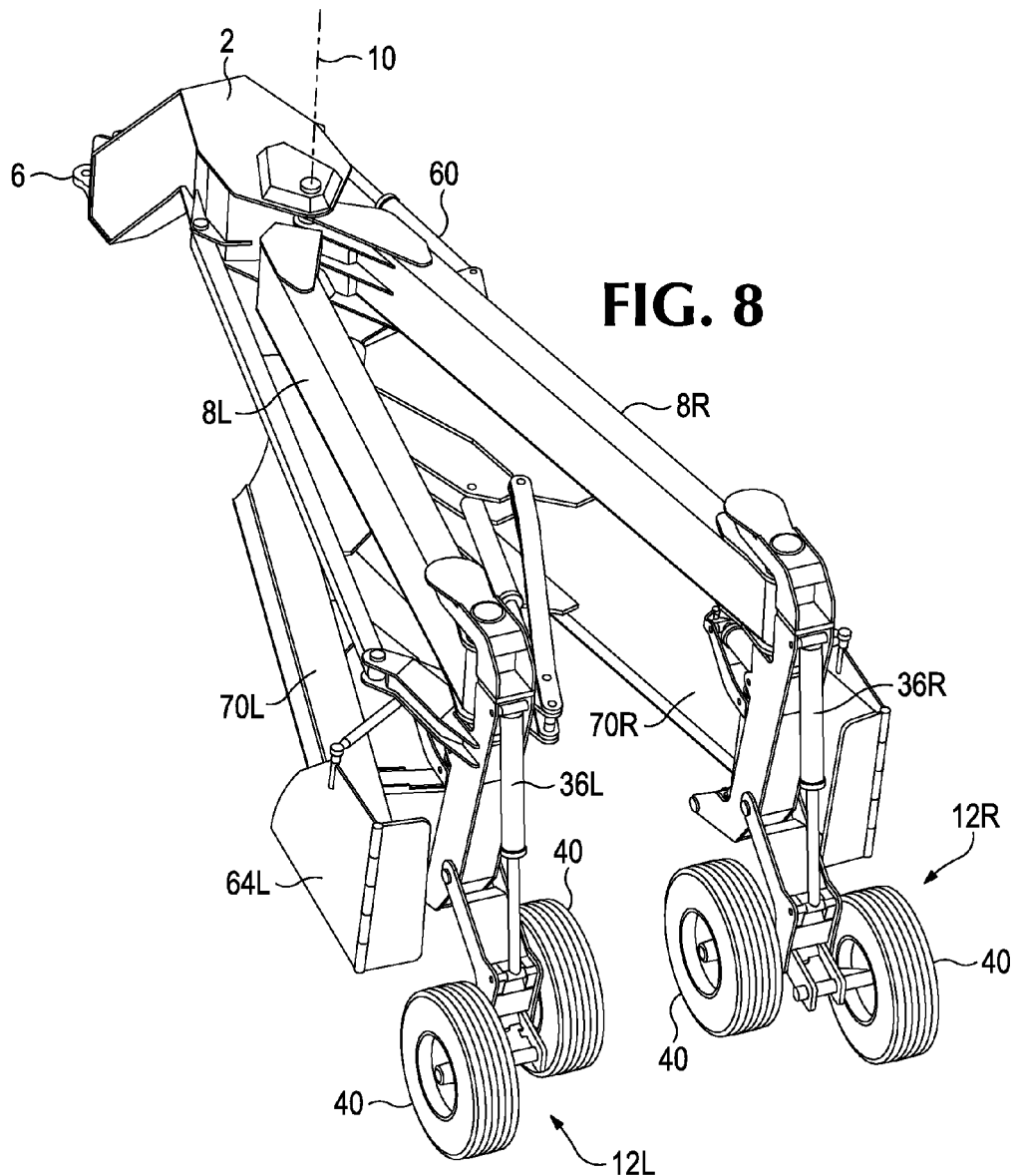
FIG. 8 is a perspective view of the scraper showing the blade in the folded disposition.

Referring again to FIG. 1, the scraper blade 42 is composed of two wings 70L and 70R that are connected by a hinge comprising bracket structures 74 welded to the two wings and a hinge pin 76 that engages the bracket structures and defines a pivot axis that is parallel to the axis 24. The two bracket structures 74 are provided with respective force transmitting bar structures 80, which are pivotally connected by a pin 82 that is to the rear of the hinge pin 76, and double-acting hydraulic cylinders 86 are effective between the bracket structures 74 and the bar structures 80. When the cylinders 86 are retracted, the pin 76 and the pin 82 are drawn together and the two wings are held in a mutually aligned disposition. The blade is then straight and is configured for use. Conversely, when the cylinders are extended the pin 76 is forced forward relative to the pin 82 and the wings are brought to a disposition, as shown in FIGS. 7 and 8, in which the blade 42 is folded. Whereas the wheel trucks 32 may be as much as 30 feet or more apart when the wings 70 are in the aligned disposition, when the blade is in the folded disposition the wheel trucks may be less than eight feet apart. By lifting the scraper blade above the ground surface and bringing the blade to the folded disposition, the scraper is suitably configured for transporting between fields of a farming operation or on a public road. Moreover, when the blade is in the folded disposition the scraper is suitably dimensioned for placing in a standard ISO shipping container, facilitating long distance transportation.

Because the pin 76 moves forward relative to the wheel assemblies 12 when the cylinders 86 are expanded to change the blade from its straight configuration to its folded configuration, the force that is exerted on the blade when the scraper is being used to move soil, rock or other material to achieve a desired topography tends urge the blade toward its straight configuration. Thus, it is not necessary to supply significant effort through the cylinders 86 to retain the blade in its straight configuration.

Figure 6:
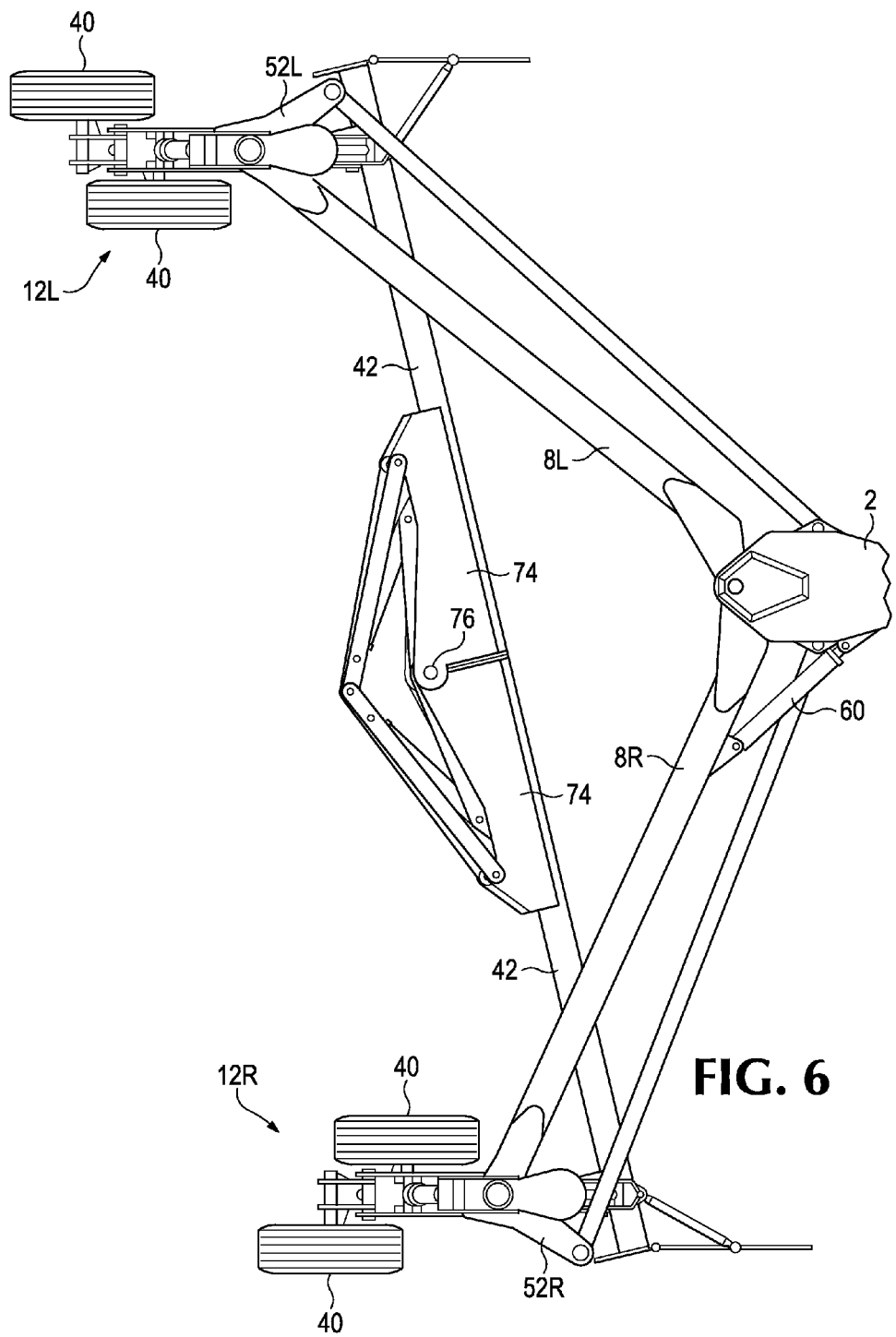
FIG. 6 is a top plan view of the scraper showing the scraper blade disposed oblique to the path of movement of the scraper.

Referring again to FIG. 6, the hydraulic controller supplies hydraulic fluid under pressure to the cylinders 36, 46, 60 and 86 in response to various input signals, including operator signals and, optionally, signals generated by GPS receivers 88L, 88R mounted on the support structures 12L, 12R respectively for detecting differences in height of the two ends of the scraper blade.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. For example, although the invention has been described in the context of a detachable implement that is towed by a tractor, the scraper may be self-propelled. In addition, although the fences 64 are illustrated as being attached directly to the wings 74, the fences 64 may alternatively be attached to extension wings that are aligned with the wings 74 and extend outward beyond the wheel assemblies 12. The blade may be in the form of a box structure and the extension wings may be withdrawn into the box structure when not needed. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An agricultural implement comprising:
   a traction structure at a forward end of the implement,
   a tool beam rearward of the traction structure and extending transverse to a longitudinal axis of the traction structure in a substantially horizontal disposition, the tool beam comprising a scraper blade,
   first and second wheeled support structures supporting the tool beam at opposite respective ends of the tool beam,
   first and second linkages each having a forward portion connected to the traction structure and having rearward portions connected to the first and second support structures respectively, and
   an actuator effective between the traction structure and the first linkage for selectively adjusting an angular position of the first linkage relative to the longitudinal axis of the traction structure,
   wherein the tool beam provides a force transmitting connecting between the rearward portions of the first and second linkages whereby angular movement of the first linkage relative to the traction structure is accompanied by angular movement of the second linkage relative to the traction structure;
   wherein the scraper blade comprises first and second segments each having an outer end and an inner end, the outer ends of the first and second segments are supported by the first and second support structures respectively, the inner ends of the first and second segments are connected together by a hinge that allows the scraper blade to be folded about a substantially vertical axis, whereby the first and second segments can be brought selectively to an aligned disposition or to a folded disposition, and the first and second segments are brought from the aligned disposition to the folded disposition by moving the inner ends of the first and second segments forward relative to the outer ends of the first and second segments;
   wherein the hinge comprises a first bracket structure and a second bracket structure, the first bracket structure being attached to the first segment of the scraper blade and the second bracket structure being attached to the second segment of the scraper blade, the first and second bracket structures being pivotally connected to one another by a first pin;
   wherein the first bracket structure is connected to a force transmitting bar structure, and the second bracket structure is connected to a second force transmitting bar structure;
   wherein the first and second force transmitting bar structures are pivotally connected to one another by a second pin;
   wherein the second pin is located rearward of the first pin;
   wherein at least one hydraulic cylinder is situated between the first and second bracket structures and the first and second force transmitting bar structures;
   wherein when the at least one hydraulic cylinder is retracted, the first and second pins and drawn together, and the first and second segments of the scraper blade are held in a mutually aligned disposition; and
   wherein when the at least one hydraulic cylinder is extended, the first pin is forced forward relative to the second pin, and the first and second segments of the scraper blade are brought to a disposition in which scraper blade is folded.

2. An agricultural implement according to claim 1, wherein each wheeled support structure has a tracking path and the first and second linkages constrain the support structures so that the tracking paths of the support structures remain parallel to the longitudinal axis of the traction structure.

3. The agricultural implement of claim 1, further comprising a first wheel assembly at a distal end of the first segment of the scraper blade and a second wheel assembly at a distal end of the second segment of the scraper blade, wherein the first segment of the scraper blade is turnable relative to the first wheel assembly about a first axis that is perpendicular to a longitudinal axis of the tool beam, and the second segment of the scraper blade is turnable relative to the second wheel assembly about a second axis that is perpendicular to the longitudinal axis of the tool beam, and wherein the first pin defines a pivot axis that is parallel to the first and second axes.

* * * * *